Jan. 24, 1933.    H. T. DURANT ET AL    1,895,412
RECOVERY OF VALUES FROM CYANIDE SOLUTIONS
Filed Sept. 5, 1931
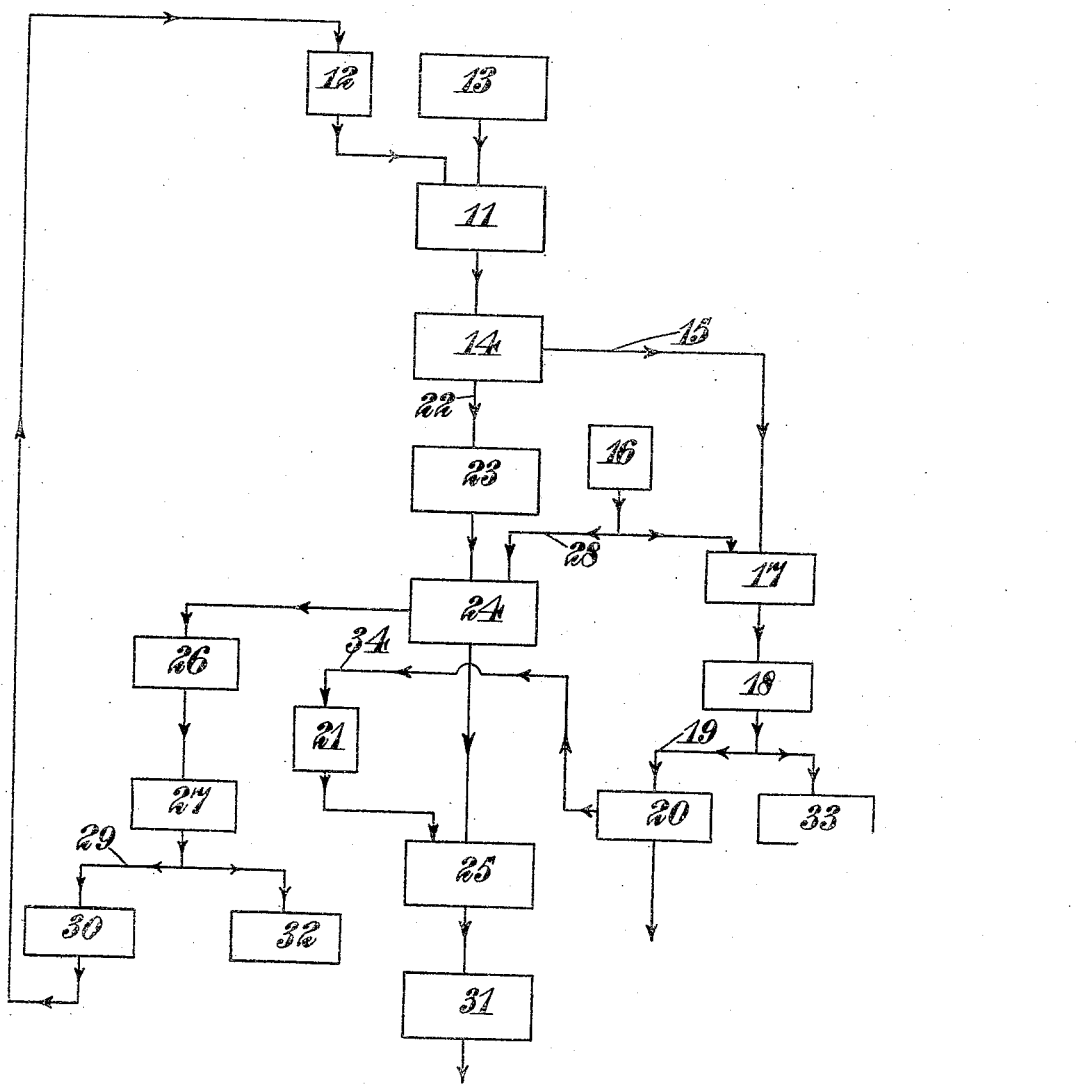
INVENTORS
H. T. Durant,
H. L. Sulman and
H. F. K. Picard,
By Watson, Coit, Thora & Grindle
Attys Patented Jan. 24, 1933

1,895,412

UNITED STATES PATENT OFFICE

HENRY THOMAS DURANT, OF CRAWLEY, AND HENRY LIVINGSTONE SULMAN AND HUGH FITZALIS KIRKPATRICK PICARD, OF LONDON, ENGLAND, ASSIGNORS TO THE GENERAL ENGINEERING COMPANY, INCORPORATED, OF LONDON, ENGLAND, A CORPORATION OF UTAH

RECOVERY OF VALUES FROM CYANIDE SOLUTIONS

Application filed September 5, 1931, Serial No. 561,472, and in Great Britain September 8, 1930.

The present invention comprises improvements in the recovery of values from cyanide solutions.

In the treatment of ores by the cyanide process after the extraction of the precious metals from the ore the solutions usually contain a certain quantity of free cyanide and they may also contain complex cyanides and alkali or alkaline-earth hydrates and salts in addition to the cyanides of the precious metals and it is an object of the present invention to recover free alkali or alkaline-earth cyanides from said solutions and also to improve the extraction of the values therefrom. The invention has special utility in cases of fouled solutions resulting from the treatment of complex gold or silver ores, and in rendering innocuous and valueless any solutions which for any reason have to be run to waste.

The present invention provides a process for the recovery of values from cyanide solutions in which excess cyanide is recovered from the solutions, after they have been employed for the extraction of values from an ore, by the addition to the solution of sulphate of zinc, the liquors being maintained acid-free so that zinc cyanide is precipitated. Thereafter valuable metals, such as gold, which may remain dissolved in the decyanided liquor, may be recovered by precipitation (for example with zinc dust).

The addition of sulphate of zinc is made (subject to what follows and if complete recovery of the free alkaline cyanides is desired) in chemical equivalence to the alkali or alkaline-earth cyanide present in the solution in accordance with the general equation:—

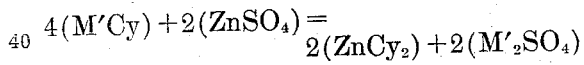

Where M' represents a monovalent alkali element or its chemical equivalent of a divalent alkali earth.

The reaction represented in the above equation takes place in two stages, and is not complete until the full equivalence of $ZnSO_4$ has been added, as in the second stage:—

(1) 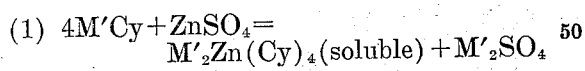

(2) 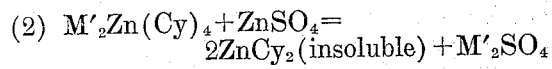

If $M'_2ZnCy_4$ pre-exists in the solution to be decyanided this quantity will also require the equivalent of $ZnSO_4$ as indicated in Equation (2).

However, if in addition to the cyanide an alkali or alkaline-earth hydroxide, or alkaline carbonate, or other salt capable of precipitating zinc sulphate be also present, a sufficiency of the zinc sulphate must be additionally provided to react with such substances, as indicated in the equation for soluble calcium hydroxide:—

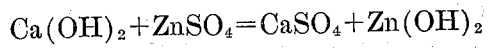

The zinc sulphate solution when added to and mixed with the cyanide solution in the proper equivalence, as determined by a simple prior test, precipitates the alkali or alkaline-earth cyanide with practical completeness, together with such other substances as may form insoluble compounds with zinc. The resulting precipitate is flocculent and is readily filtered and washed, whence the alkali or alkaline-earth cyanide may be recovered for reemployment in one or other ways, described later.

Should the zinc sulphate solution contain any free acid the recovery of the cyanide as insoluble zinc cyanide would be incomplete, since free HCy would be liberated, which is not fully precipitated by zinc sulphate solution. Indeed to ensure the complete recovery of all cyanide the mixed solutions should be kept very slightly alkaline and a very slight excess of zinc sulphate should be employed. The recovery of cyanide is so complete that the filtrate when tested in the usual way will seldom show residual cyanide to the extent of 0.005%.

According to one feature of the present invention, in the precipitation of precious metals from decyanided liquor produced as above described, the liquor from which precipitation is to be effected is rendered acid, and precipitation is thereupon effected with the aid of metallic zinc. We have found that by working in acidified solutions in this manner remarkably complete precipitation of the precious metals can be obtained with the aid of precipitants such as zinc dust, notwithstanding the fact that no free alkaline cyanide is present in the liquor.

The degree of acidity required for the purpose of the present invention may be relatively slight and may in general be produced by the addition of substantially less than one pound of sulphuric acid per ton of liquor. It is desirable to use such an amount of acid as will maintain the condition of slight acidity during precipitation.

It is an advantage of the precipitation of precious metals in accordance with the present invention that it is unnecessary to take special precautions for eliminating or reducing the quantity of dissolved oxygen which may be present in the liquors.

The invention is not limited to the case where the residual amounts of precious metals are recovered from decyanided waste liquors. On the contrary, the invention includes a process for the extraction of precious metals from ores, wherein the ore is treated with an alkaline-cyanide solution to dissolve the precious metals, the solution containing the precious metals is then freed from cyanide by the employment of zinc sulphate and thereafter the precious metal is precipitated from the decyanided solution by the employment of metallic zinc (for example zinc dust or shavings), preferably after acidification of the liquor.

The invention further includes a process for the recovery of metals from ores wherein the ore is treated with an alkali cyanide solution to dissolve metals therefrom, the solution is then freed from cyanide and copper silver or other valuable metals by precipitation therefrom by reaction with zinc sulphate and subsequently said metals are recovered from the precipitate. The cyanide containing precipitate may also be treated for the recovery of cyanide.

According to another feature of the invention, which is particularly adapted for employment where the process of the present invention is to be used in existing plants for cyanide recovery from precious metals, a portion of the circuit liquor is diverted from cyclic use in the process, decyanided (and thus purified from metallic compounds which have been held in solution in the alkaline cyanide liquor) by the employment of zinc sulphate and thereafter freed from precious metal by precipitation with metallic zinc. The circuit liquor so withdrawn from the normal cycle of the cyanide process can now be used as wash in lieu of fresh water, or alternatively may be fortified with alkali (or alkali earth) cyanide and used as fresh working solution.

The point at which circuit liquor is withdrawn from the process may be either before or after the normal precipitation of gold and silver in the cyanide process by the aid of zinc powder, zinc shavings, or other suitable precipitant.

In carrying the process of the present invention into practical effect it is desirable that during precipitation of excess cyanide with zinc sulphate the liquor should be slightly alkaline. It may, for example, have a pH value of approximately 7.5 to 8, which although neutral to phenol phthalein represents a detectable degree of alkalinity.

It will be understood that where the liquors according to the present invention are cyclically re-used, and are not intended to be discharged from the circuit after precipitation and decyaniding, the recovery of residual gold and silver by precipitation with metallic zinc is not essential, since such gold is returned to the normal working circuit.

The following is a description by way of example of one method of carrying the invention into effect, reference being made to the accompanying drawing which is a flow sheet showing the sequence of operations of the process:—

An apparatus is provided comprising one or more treatment tanks 11 for receiving cyanide solution after contact with ore for example at 13. The treatment tanks 11 are provided with mechanical agitators and means are provided to deliver to them measured quantities of zinc sulphate solution of known strength from a tank 12. In the treatment tanks a flocculent precipitate is produced consisting mainly of zinc cyanide together with zinc ferro-cyanide, zinc hydroxide and the like. The precipitate may also contain a proportion of any silver values present in the liquor. From the treatment tanks the liquor, after decyaniding, as just described, with zinc sulphate solution, is pumped together with the precipitate which it contains, to a thickener 14 where the clear liquor is continuously separated from the precipitate. The flow of clear liquor is indicated by line 15. To the resultant clear liquor a small quantity of sulphuric acid from 16 is added at 17, sufficient to ensure precipitation of the gold and silver present upon zinc and the liquor is passed into a zinc box 18. In this way substantially the whole of the gold and silver present in the solution are recovered and pass out of the process at 33. The effluent solution 19 from the zinc box 18 may be thrown away or it may be re-used for any operations in the process where water is required, according to circumstances. In the flow sheet it is shown as passing along line 34 to a milk-of-lime preparation unit 21 hereinafter referred to.

The precipitate 22 from the thickener is discharged into a head tank 23 and from thence taken into a still 24 which contains agitating means and is connected, above the liquid level, to an absorption apparatus 25 hereinafter referred to. There is a discharge from the bottom of the still to a tank 26 to receive residual liquor and insolubles, and from this tank the contents are pumped to a filter press 27. The still 24 is also provided with a connection 28 to the supply tank 16 for sulphuric acid and with means for heating the still contents, as for example by the injection of live steam.

The precipitate carried to the still 24 from the thickener 14 is heated in the still with the addition of a sufficiency of acid to regenerate the zinc sulphate from the zinc cyanide, zinc hydroxide or other compounds, to set free hydrocyanic acid. The latter passes away in the still vapours to the absorption apparatus 25 where it is treated with milk-of-lime from the mixer 21 and absorbed. The insoluble matter in the still 24, which consists mainly of undecomposed zinc ferro-cyanide, is discharged, with the zinc sulphate solution produced, into the reception tank 26 aforesaid and thence pumped to the filter press 27 where regenerated zinc sulphate is recovered as clear liquid, collected (via line 29) in tank 30 and redelivered to the apparatus 12 which feeds zinc sulphate to the de-cyaniding treatment tanks 11. The insolubles are collected at 32 and are treated for recovery of metallic values as warranted by their contents.

Returning to the cyanide-containing vapours from the still these are passed, as has already been mentioned, to the absorption apparatus 25 where they are mixed with water containing calcium hydrate in the form of milk-of-lime. The absorption liquor is maintained in circulation by suitable means. The liquor resulting from this operation contains regenerated alkali cyanide which after clarification in tank 31 is returned to the ore treatment plant for making up fresh cyanide liquors. A vacuum pump is provided for maintaining the still 24 and absorption apparatus 25 under reduced pressure. This accelerates distillation of HCy and prevents its escape into the atmosphere through any faulty joint.

*Example*

In a particular case a working solution was taken, such as is ordinarily obtained from treatment of an ore with alkali cyanide, and was put through a process similar to that just described, under laboratory conditions.

This solution contained free alkaline cyanide equivalent to 0.16% KCy, 0.02% of lime, ferrocyanides equivalent to 0.03% $K_4FeCy_6$, sodium sulpho-cyanide 0.02%, copper cyanides equivalent to 0.28% copper, zinc double cyanide equivalent to 0.05% zinc, gold 5 dwts. per long ton, silver 15 dwts. per long ton.

To this liquor was added 18 lbs. per ton of zinc sulphate ($ZnSO_4.7H_2O$). Phenol phthalein indicator showed no colour in the resulting liquor. A copious flocculent precipitates was produced consisting mainly of zinc cyanide together with zinc ferro-cyanide, zinc hydroxide etc. After standing for a short time this liquor was filtered through a thickener. The clear liquor contained practically no cyanide (less than 0.005%) but retained practically all the gold, and about 40% of the silver originally present, together with alkaline sulpho-cyanide. The clear solution was acidified with sulphuric acid and was passed at the normal rate through a zinc box containing zinc shavings, where the gold and silver were precipitated almost completely.

The zinc cyanide precipitate retained by the thickener, containing about 85% of moisture, was transferred to a still, the outlet pipe of which was taken into an absorber containing milk-of-lime. The distillation and absorption circuit was maintained under a vacuum of about 15 inches of mercury at the pump. Sulphuric acid in slight (commercial) excess of the chemical equivalent of the zinc present in the precipitate was added to the still, and the hydrocyanic acid (evolved by suitably heating the still contents) was absorbed in the milk-of-lime.

The product remaining in the still after distillation consisted of a solution of zinc sulphate together with some undecomposed zinc ferro-cyanide and other insoluble compounds and after filtration yielded zinc sulphate liquor.

In the solid residue from the still, which consisted largely of zinc ferro-cyanide, the majority of the copper originally in the liquor was found to be present, and about 60% of the silver.

The clear liquor from the milk-of-lime absorption apparatus was found to contain cyanide equivalent to 98.8% of that originally present in the working liquor taken, which was thus available for fortifying the clarified liquor for re-use as a working solution.

Instead of employing calcium hydrate as an absorbing solution for the HCN gas, where convenient any working cyanide solution containing a sufficiency of protective alkali may be employed.

We claim:—

1. A process for the recovery of values from cyanide solutions, characterized by the fact that excess cyanide is recovered from the solutions, after they have been employed for the extraction of values from an ore, by the addition to the solution of sulphate of zinc, the liquors being maintained acid-free so that zinc cyanide is precipitated.

2. A process for the recovery of values from cyanide solutions as claimed in claim 1, wherein valuable metals, such as gold, remaining in the liquor after excess cyanide is removed are recovered by precipitation on metallic zinc.

3. A process for the recovery of values from cyanide solutions characterized by the fact that excess cyanide is recovered from the solutions, after they have been employed for the extraction of values from an ore by the addition to the solution of sulphate of zinc, the liquors being maintained acid free so that zinc cyanide is precipitated, and thereupon rendering the liquors acid and then precipitating valuable metals such as gold, by metallic zinc.

4. A process for the recovery of values from cyanide solutions as claimed in claim 3, wherein the quantity of acid employed is such as will maintain a condition of slight acidity throughout precipitation of the metals.

5. A process for the extraction of precious metals from ores, wherein the ore is treated with an alkaline cyanide solution to dissolve metals therefrom, the metal-containing solution is then freed from excess cyanide by the employment of zinc sulphate and thereafter the metal is precipitated from the solution by the employment of metallic zinc.

6. A process for the recovery of values from cyanide solutions as claimed in claim 1 wherein the cyanide containing precipitate is treated with an acid and distilled to obtain hydrocyanic acid therefrom.

7. In a process for the recovery of precious metals from ores by the employment of cyanide, wherein the cyanide liquor is used cyclically, diverting a portion of the circuit liquor from cyclic use in the process, removing excess cyanide therefrom and thus purifying it from metallic compounds which have been held in solution in the alkaline liquor by the employment of zinc sulphate and thereafter freeing it from the precious metal by precipitation on metallic zinc.

8. A process of cyanide recovery of metals as claimed in claim 7, wherein the circuit liquor is withdrawn from the cycle at a point after the normal precipitation of gold and silver in the cyanide process by the aid of zinc or other precipitant.

9. A process for the extraction of precious metals from ores, wherein the ore is treated with an alkaline cyanide solution to dissolve metals therefrom, the metal-containing solution is then freed from excess cyanide by the employment of zinc sulphate, and thereupon rendering the solution acid and then precipitating the metal by the employment of metallic zinc.

10. A process for the recovery of values from cyanide solutions as claimed in claim 1 wherein the cyanide containing precipitate is treated with sulphuric acid and distilled to obtain hydrocyanic acid therefrom.

In testimony whereof we affix our signatures.

HENRY THOMAS DURANT.
HENRY LIVINGSTONE SULMAN.
HUGH FITZALIS KIRKPATRICK PICARD.